(12) United States Patent
Espinasse

(10) Patent No.: US 6,401,760 B2
(45) Date of Patent: Jun. 11, 2002

(54) SUBSEA FLEXIBLE PIPE OF LONG LENGTH AND MODULAR STRUCTURE

(75) Inventor: Philippe François Espinasse, Bihorel (FR)

(73) Assignee: Coflexip (FR)

( * ) Notice: Subject to any disclaimer, the term of this patent is extended or adjusted under 35 U.S.C. 154(b) by 0 days.

(21) Appl. No.: 09/732,677

(22) Filed: Dec. 8, 2000

(30) Foreign Application Priority Data

Dec. 17, 1999 (FR) .............................................. 99 15968

(51) Int. Cl.$^7$ ................................................. F16L 11/12
(52) U.S. Cl. ........................ 138/135; 138/134; 138/129; 138/174
(58) Field of Search ................................. 138/135, 134, 138/130, 129, 133, 174

(56) References Cited

U.S. PATENT DOCUMENTS

| | | | |
|---|---|---|---|
| 4,854,781 A | | 8/1989 | Sparks et al. ................ 405/224 |
| 5,275,209 A | * | 1/1994 | Sugier et al. ............ 138/130 X |
| 5,406,984 A | * | 4/1995 | Sugier et al. ............ 138/130 X |
| 5,730,188 A | * | 3/1998 | Kalman et al. ........... 138/130 X |
| 5,813,439 A | * | 9/1998 | Herrero et al. ........... 138/130 X |
| 6,039,083 A | * | 3/2000 | Loper ...................... 138/125 X |
| 6,065,501 A | * | 5/2000 | Feret et al. .............. 138/133 X |

FOREIGN PATENT DOCUMENTS

FR 2664019 1/1992

OTHER PUBLICATIONS

"Specification for Unbonded Flexible Pipe", American Petroleum Institute, API Specification 17J, First Edition: Dec. 1996, Effective Date: Mar. 1, 1997, pp. 1–42.
"Recommended Practice for Flexible Pipe", American Petroleum Institute API Recommended Practice 17B (RP 17B), First Edition, Jun. 1, 1988, pp. 1–37.

* cited by examiner

*Primary Examiner*—Patrick Brinson
(74) *Attorney, Agent, or Firm*—Ostrolenk, Faber, Gerb & Soffen, LLP

(57) ABSTRACT

This one-piece subsea flexible multilayer tubular pipe comprises a carcass (1) made of interlocked metal strip, an inner sealing sheath (2) made of a polymer material, a winding of an interlocked metal element (3) wound in a helix with a short pitch, at least one ply (5) of tensile armor layers wound with a long pitch around the pressure vault, where appropriate at least one thermal insulation layer (7) and an outer protective sealing sheath (8); this pipe has, over its length, sections intended for regions of different use and the physical characteristics of at least one of the layers are modified at manufacture over at least one section of the length of the pipe, without modifying the outside diameter of the said layer, so as to tailor the properties of the pipe in this section to the conditions for the zone in which it will be used.

36 Claims, 2 Drawing Sheets

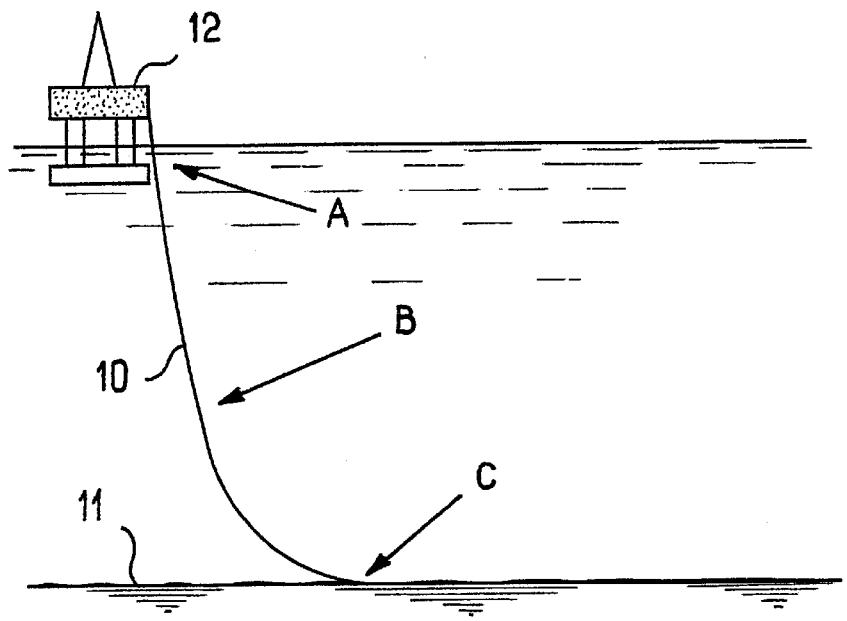
FIG_1
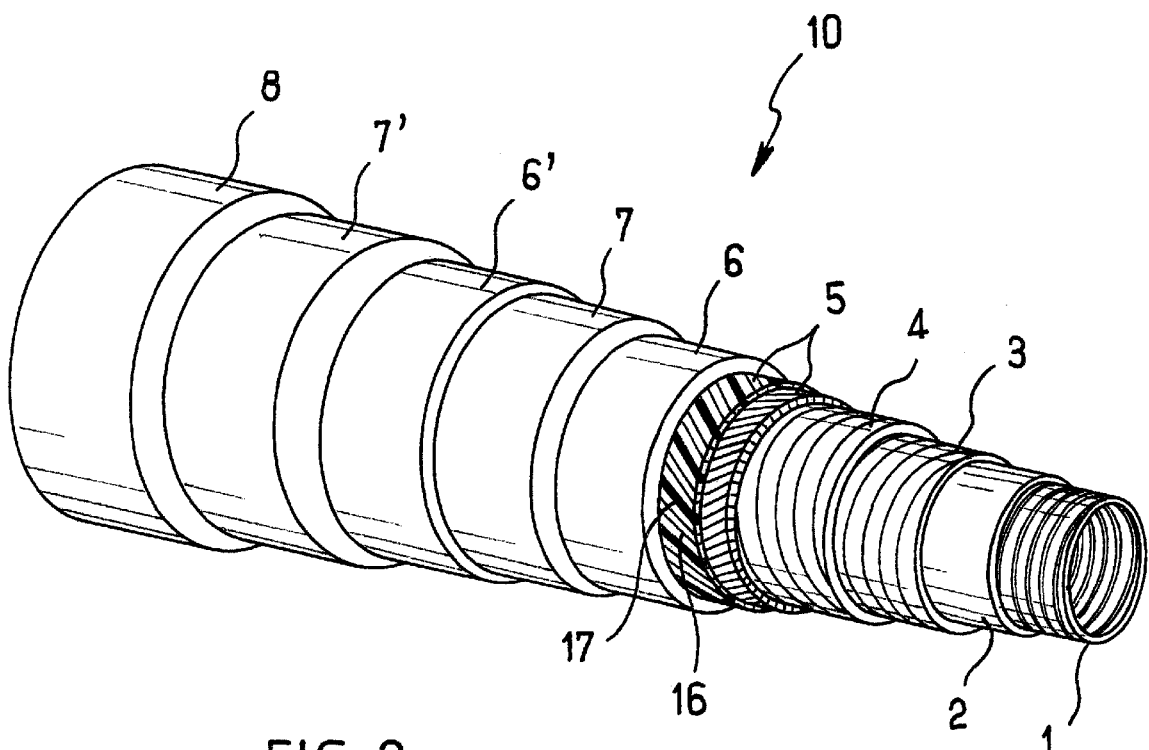
FIG_2

SUBSEA FLEXIBLE PIPE OF LONG LENGTH AND MODULAR STRUCTURE

The present invention relates to a flexible pipe for transporting, over long distances, a fluid which is under pressure and possibly at a high temperature, such as a gas, petroleum, water or other fluids. The invention relates most particularly to a pipe intended for offshore oil exploration. It relates especially, first, to the flow lines, that is to say flexible pipes unwound from a barge in order to be laid generally on seabed and connected to the subsea installations, such as pipes working mainly in static mode and, more particularly, secondly, the risers, that is to say flexible pipes which are unwound from a surface installation such as a platform and are connected to the subsea installations and most of which do not lie below the seabed, such pipes working essentially in dynamic mode.

The flexible pipes used offshore must be able to resist high internal pressures and/or external pressures and also withstand longitudinal bending or twisting without the risk of being ruptured.

They have various types of configurations depending on their precise use but in general they satisfy the constructional criteria defined in particular in the standards API 17 B and API 17 J drawn up by the American Petroleum Institute under the title "Recommended Practice for Flexible Pipe".

Such pipes manufactured in long lengths comprise, from the inside outwards, at least some of the following layers:

- a carcass consisting of an interlocked metal strip, which serves to prevent the pipes being crushed under pressure;
- an internal sealing sheath made of a plastic, generally a polymer, able to resist to a greater or lesser extent the chemical action of the fluid to be transported;
- a pressure vault resistant to the external pressure but mainly to the pressure which is developed by the fluid (internal pressure) in the sealing sheath and which is manifested by hoop forces in the pressure vault; the pressure vault comprises a winding of one or more interlocked profiled metal wires (which may or may not be self-interlockable) wound in a helix with a short pitch (i.e. with a wind angle with respect to the pipe axis of between 75° and almost 90°) around the inner sheath; these profiled wires are typically profiled wires whose cross sections have the form of a T, a U and a Z and their variants, these being known by the name "teta" and "zeta";
- where appropriate, a hoop consisting of a metal wire wound with a short pitch, without interlocking, and intended to increase the resistance of the vault to the internal pressure; the hoop is generally a flat wire with a rectangular cross section;
- at least one ply (and generally at least two crossed plies) of tensile armor layers whose lay angle measured along the longitudinal axis of the pipe is about 55° or less; and
- where appropriate, at least one thermal insulation layer; and
- an external protective sealing sheath made of a polymer.

Such a standard flexible pipe is manufactured layer by layer, in a sequential manner with intermediate storage. The interlocked strip which serves as a core is therefore manufactured in a single run on a spiraller/profiler, with a single machine setting and a single material, and then stored on a reel. Next, this core is sheathed on an extrusion line where, likewise, a material is only applied to it with a given setting and it is again stored on a reel. The phases of laying down the pressure vault(s), armor layer(s), intermediate sheaths, thermal insulation and external sheaths are carried out according to the same principle.

The flexible risers are subject to working load criteria which can vary mainly depending along their curvilinear abscissa on the suspended length, on the local water depth and on the conditions within the ocean, especially for deepsea applications.

Hitherto, a practice has been to devise a structure for the flexible pipes for which each layer was designed for the maximum anticipated stress over the entire length of the flexible pipe, this stress being confirmed through an iterative calculation in order to take into account the effect of the adjacent layers. Each layer may therefore be very much over-designed in certain regions. This has the drawback of increasing the mass of the flexible pipe, increasing the size of the installation equipment, the handling means and therefore the overall cost of the project. In some cases, the increase in the mass of the pipe and in the drag may cause the stress in certain layers to increase and may require the said layers to be reinforced, hence a further increase in the mass. This may be prejudicial to the final surface support, by limiting its load capacity and requiring additional structural reinforcements and therefore increasing its cost.

Alternatively, not one structure but two (or more) different structures have been used, these being linked together by one or more intermediate connections, each of these structures being tailored to its environment. This has the drawback of calling for expensive intermediate connectors, requiring the addition of stiffeners in order to prevent concentrations of bending moments in dynamic use. This connection must be positioned in a region where the dynamic forces vary little. An intermediate connection is an additional risk of leakage and also requires a specific procedure in order not to damage it during installation. Of course, the cost and risks of installation are increased.

The objective of the invention is to propose a novel alternative solution which does not have the aforementioned drawbacks.

The objective of the invention is achieved within the context of a pipe as defined above by the fact that the physical characteristics of at least one of the layers of the pipe are modified at manufacture over at least one section of the length of the pipe, without any intermediate connector and, advantageously, without substantially modifying the outside diameter of the said layer. Thus, the structure of the flexible pipe is optimized so that each layer in each region is matched to the stresses to which it is subjected without overloading the rest of the structure, while remaining compatible with the constraints associated with the manufacture and with the production machines. Depending on the desired aim, one or more layers may be modified and the modifications may be done in various ways, by changing material, changing shape, changing treatment, etc.

In a first embodiment, the modified layer is the carcass. To modify the physical characteristics of the carcass, it is possible either to change its moment of inertia by changing the thickness of the strip or the shape of the interlocking (waves of larger or smaller height), or its mechanical properties by changing the material or the treatment (degree of work hardening).

In a second embodiment, the modified layer is the vault. To modify the physical characteristics of the vault, it is possible, as in the case of the carcass, to modify its moment of inertia by changing the thickness of the wire while keeping or not keeping the same wire shape, or its mechanical properties by changing the mechanical properties of the steel (by heat treatment, work hardening, etc.). The annular space created when going from a wire having a large moment of inertia to a wire having a smaller moment of inertia must be filled with filling means so as to maintain a constant diameter. The filling means may be either a plastic rod or one or more plies of armor layers, the objective being to have the same outside diameter when going from one cross section to another (that is to say when going from the wire having a large moment of inertia to the wire having a lower moment of inertia+filling means) so as to be able to manufacture the next layer. The modifications are performed with a constant pitch; the width of the various profiled wires used is therefore identical.

In a third embodiment, the modified layer is the hoop. To modify the physical characteristics of the hoop, it is possible to modify its moment of inertia by changing its thickness or changing the mechanical properties of the steel (by heat treatment, work hardening, etc.). The annular space created by a change in thickness may be filled with the same means as those which were described in the case of the vault.

In a fourth embodiment, the modified layer is the armor layer. To modify the physical characteristics of this layer, it is possible to modify its moment of inertia by changing its thickness (by providing annulus-filling means) or changing the mechanical properties of the steel (by heat treatment, work hardening, etc.) or else by modifying the mechanical performance of the layer by replacing some of the armor wires with filling wires, while maintaining the organization of the layer.

In a fifth embodiment, the modified layer is the thermal insulation layer. To modify the physical characteristics of the thermal insulation layer, it is possible to change the thermal performance by choosing a material resistant to the local external pressure or by decreasing the number of insulation layers or the thickness of the layers.

The invention will be more clearly understood and further advantages and features will become apparent on reading the following description of embodiments of the flexible Pipe according to the invention. Reference will be made to the appended drawings in which:

FIG. 1 is a diagram of a dynamic riser and of the various regions that may be distinguished therein;

FIG. 2 is a perspective view of a riser pipe having a modification in the armor layers;

Figure 4:
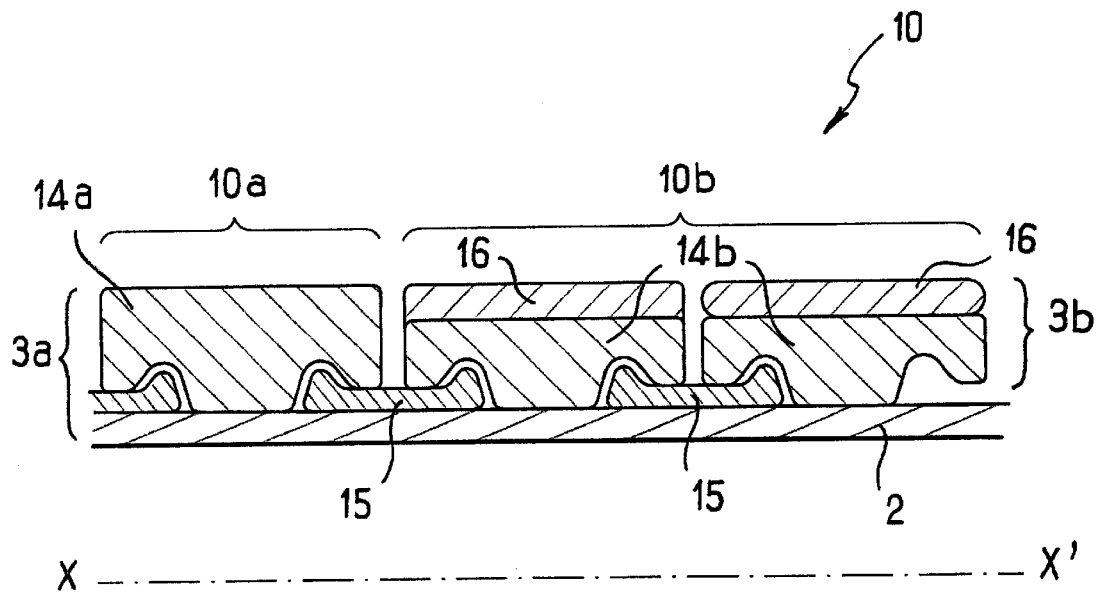
FIG. 4 is a longitudinal half-sectional view of a pipe showing a modification in the structure of the pressure vault.

FIG. 1 illustrates a typical configuration of a dynamic riser 10, part of which is on the seabed 11 and another part rises up to a platform 12. In this configuration, three regions may be distinguished, these being quite different from the standpoint of stresses, namely a region A, at the top of the riser, subjected to a high axial tensile force and to a low external pressure and subject to fatigue; an intermediate region B subjected to an increasing hydrostatic pressure, to a decreasing tensile force and to small variations in curvature; and a bottom region C subjected to a low axial tensile force, a high hydrostatic pressure and small variations in tensile force. In region A, it is necessary to increase the mechanical properties of the pressure vault in order to take into account the large pressure difference between the internal pressure and the external pressure, although this difference is reduced at the bottom of the sea. Likewise, in the case of the armor layers the tension due to the tensile load and to the pressure decrease strongly on descending towards the bottom, as does the fatigue induced by the metocean conditions. In region C, the internal interlocked strip will become much more highly stressed so as to resist the external hydrostatic pressure and will have to have a higher moment of inertia and/or mechanical properties than at the surface. The thermal insulation layers will have to have a much higher compressive strength in this region, together with a higher heat resistance since the fluids transported are hotter.

FIG. 2 shows an example of constituent layers of the pipe 10 with, from the inside outwards: a metal carcass 1, generally consisting of an interlocked strip and intended to resist being crushed under the external pressure; a polymeric inner sealing sheath 2, a metal pressure vault 3, consisting here in a conventional manner of the winding of an interlocked profiled metal wire wound in a helix with a short pitch (wind angle generally about 90° with respect to the pipe axis); a hoop layer 4, two armor plies 5 resistant to the axial tensile load in the longitudinal direction of the pipe and conventionally consisting of two crossed plies wound with a long pitch (wind angle typically less than 55° with respect to the pipe axis) in opposite senses; a pair of intermediate sealing sheath layers 6, 6' and a pair of thermal insulation layers 7, 7'; and a polymeric outer sheath 8.

According to the invention, the physical characteristics of one or other of these layers may be modified during manufacture without the need for an intermediate connector.

Figure 3:
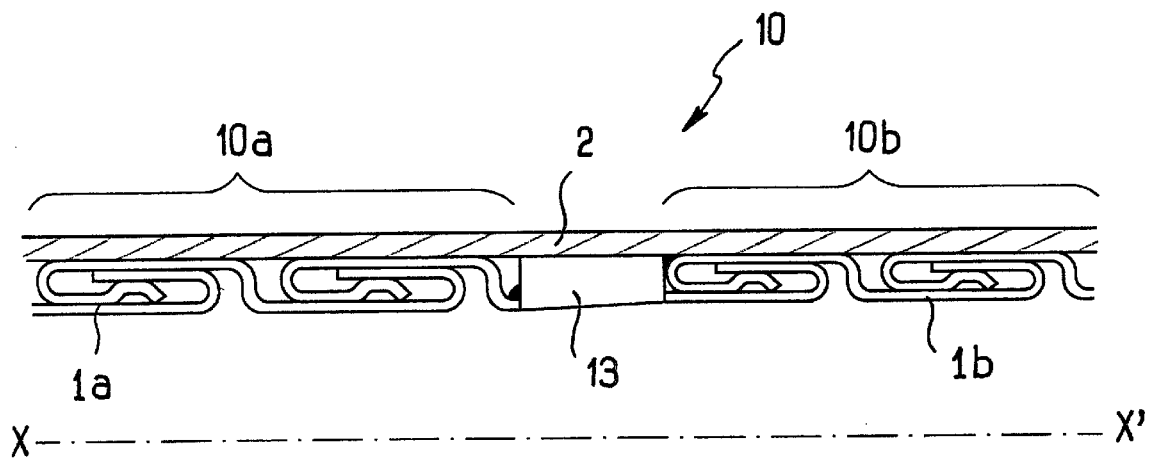
FIG. 3 is a longitudinal half-sectional view of a pipe showing a modification in the structure of the carcass.

Thus, FIG. 3 illustrates a modification of the strip layer 1 between two sections 10a and 10b of the pipe 10 of axis XX' which are intended for different regions of use. The thickness of the strip making up the carcass 1a of the section 10a is greater than that of the strip making up the carcass 1b of the section 10b so as to modify the moment of inertia in the carcass, while maintaining an unmodified outside diameter of the layer so that it is possible, without any change, to apply the sealing sheath 2. The strips forming the layers 1a, 1b are joined together by a welded and/or assembled adapter 13. Of course, physical characteristics other than the strip thickness may be modified at manufacture, such as the shape of the folding (this allows the thickness of the carcass to be modified) and the nature of the strip or the treatments to which it is subjected (for example standard or increased work hardening) in order to obtain the desired effect.

FIG. 4 illustrates a modification of the pressure vault 3 consisting of a winding of T-shaped profiled wire interlocked with a U-shaped wire. In the section 10a of the pipe, the profiled wire 14a interlocked with the wire 15 is taller and has a higher moment of inertia than the wire 14b of the section 10b. In order to keep the outside diameter of the pressure vault layer 3a and 3b constant, the difference in height is filled with filling means 16 wound onto the wire 14b having the low moment of inertia. Here again, depending on the situation, it is possible for the modification to be by means other than the physical characteristics (including inter alia their mechanical properties, their behaviour in the presence of corrosive fluids and their fatigue behaviour) of the pressure vault, especially by modifying the production process (for example by a variation in an annealing treatment or in the degree of work hardening), or of the grade employed.

The characteristics of the armor layer may be modified in the same way, by changing the production process, the grade or even the material used. Thus, carbon or grades of stainless steel having high mechanical properties may be used in the upper part of the riser for very corrosive and highly stressed conditions, or else a wire made of quenched and tempered steel. In addition, because of their mode of operation (load transfer by the capstan effect), it is not necessary to develop very high-performance welding procedures in order to go from one section to another.

It is also possible to replace some of the metal armor wires 16 with plastic filling wires 17, while maintaining the organization of the armor layer, as shown in FIG. 2.

In the same way, it is possible to tailor the thermal insulation grades to the operating temperature of the flexible pipe and to the external hydrostatic pressure. The fact of requiring a lower compressive strength generally allows the use of materials with a markedly higher insulation coefficient.

What is claimed is:

1. A one-piece subsea flexible tubular pipe comprising, from the inside outward, the following layers: a carcass made of interlocked metal strip; an inner sealing sheath made of a polymer material; a vault comprising a winding of an interlocked metal element wound in a helix with a short pitch and placed over the inner sheath; at least one ply of tensile armor layers wound with a long pitch around the pressure vault; and an outer protective sealing sheath made of a polymer; the pipe having sections subjected to different internal and external stresses over its length, wherein the physical characteristics of at least one of said layers are modified at manufacture over at least one section of the length of the pipe, without any intermediate connector.

2. The pipe as claimed in claim 1, wherein the physical characteristics of the layer are modified without substantially modifying its outside diameter.

3. The pipe as claimed in claim 1, in which the modified layer is the carcass, wherein the modification is selected from the group consisting of modifying the moment of inertia by changing the thickness or the interlocking shape of the strip, modifying the mechanical properties by changing the nature of the material of which the strip is composed and changing the treatment that the strip undergoes during its manufacture.

4. The pipe as claimed in claim 1, in which the modified layer is the vault, wherein the modification is selected from the group consisting of modifying the moment of inertia by changing the thickness of the wire and modifying the mechanical properties of the steel of which the wire is made.

5. The pipe as claimed in claim 1, further comprising a hoop of a metal wire wound with a shorter pitch than the armor layer around the vault, wherein the modified layer is the hoop, and wherein the modification is selected from the group consisting of modifying the moment of inertia by changing the thickness of the hoop and modifying the mechanical properties of the steel of which the hoop is made.

6. The pipe as claimed in claim 1, wherein the armor layers are of steel and comprise armor wires; and the modified layer is the armor layers, and wherein the modification is selected from the group consisting of modifying the moment of inertia by changing the thickness of the plies of the armor layers, modifying the mechanical properties of the steel of which the armor layers are made, and replacing some of the armor wires with filling wires.

7. The pipe as claimed in claim 5, in which the modification is a change in thickness, with filling means in order to maintain the same outside diameter.

8. The pipe as claimed in claim 1, further comprising at least one layer of thermal insulation over the armor layers; and the modified layer is the thermal insulation layer, wherein the modifications are in thermal performance.

9. The pipe as claimed in claim 2, in which the modified layer is the carcass, wherein the modification is selected from the group consisting of modifying the moment of inertia by changing the thickness or the interlocking shape of the strip, modifying the mechanical properties by changing the nature of the material of which the strip is composed and changing the treatment that the strip undergoes during its manufacture.

10. The pipe as claimed in claim 2, in which the modified layer is the vault, wherein the modification is selected from the group consisting of modifying the moment of inertia by changing the thickness of the wire and modifying the mechanical properties of the steel of which the wire is made.

11. The pipe as claimed in claim 2, further comprising a hoop of a metal wire wound with a shorter pitch than the armor layer around the vault, wherein the modified layer is the hoop, and wherein the modification is selected from the group consisting of modifying the moment of inertia by changing the thickness of the hoop and modifying the mechanical properties of the steel of which the hoop is made.

12. The pipe as claimed in claim 2, wherein the armor layers are of steel and comprise armor wires; and the modified layer is the armor layers, and wherein the modification is selected from the group consisting of modifying the moment of inertia by changing the thickness of the plies of the armor layers, modifying the mechanical properties of the steel of which the armor layers are made, and replacing some of the armor wires with filling wires.

13. A one-piece subsea flexible tubular pipe extending between ends of the pipe, the pipe comprising, from the inside outward, layers including: an inner sealing sheath made of a polymer material, and at least one ply of tensile armor layers wound with a long pitch and disposed outward of the inner sheath;

the one-piece pipe having a length and having sections along the length thereof that are subject to different internal and external stresses over the length of the pipe, wherein the physical characteristics of at least one of the layers are modified at manufacture over at least one section of the length of the pipe, without any intermediate connector between the sections of the pipe.

14. The pipe as claimed in claim 13, wherein the at least one modified layer has an outside diameter and that outside diameter is not substantially modified in the section as compared with the outside diameter of the layer other than in the section.

15. A one-piece subsea flexible tubular pipe extending between ends of the pipe, the pipe comprising, from the inside outward, layers including: an inner sealing sheath made of polymer material, and at least one ply of tensile armor layers wound with a long pitch and disposed outward of the inner sheath;

the one-piece pipe further including layers selected from the group consisting of: a carcass made of interlocked metal strip disposed inside the inner sheath; a vault comprising a winding of an interlocked metal element wound in a helix with a short pitch placed over the inner sheath; and an outer protective sealing sheath made of a polymer and placed outside of the pressure vault;

the one-piece pipe having a length and having sections subjected to different internal and external stresses over the length of the pipe, wherein the physical characteristics of at least one of the layers are modified at manufacture over at least one section of the length of the pipe, without any intermediate connector between the sections of the pipe.

16. The one-piece subsea flexible tubular pipe according to claim 15, wherein the at least one modified layer has an outside diameter and that outside diameter is not substantially modififed in the section as compared with the outside diameter of the layer other than in the section.

17. The one-piece subsea flexible tubular pipe according the claim 15, in which the modified layer is the carcass, wherein the modification is selected from the group consisting of modifying the moment of inertia by changing the thickness or the interlocking shape of the strip, modifying the mechanical properties by changing the nature of the material of which the strip is composed and changing the treatment that the strip undergoes during its manufacture.

18. The one-piece subsea flexible tubular pipe according to the claim 15, in which the modified layer is the vault, wherein the modification is selected from the group consisting of modifying the moment of inertia by changing the thickness of the wire and modifying the mechanical properties of the steel of which the wire is made.

19. The one-piece subsea flexible tubular pipe according the claim 15, further comprising a hoop of a metal wire wound with a shorter pitch than the armor layer around the vault, wherein the modified layer is the hoop, and wherein the modification is selected from the group consisting of modifying the moment of inertia by changing the thickness of the hoop and modifying the mechanical properties of the steel of which the hoop is made.

20. The one-piece subsea flexible tubular pipe according the claim 15, wherein the armor layers are of steel and comprise armor wires; and the modified layer is the armor layers, and wherein the modification is selected from the group consisting of modifying the moment of inertia by changing the thickness of the plies of the armor layers, modifying the mechanical properties of the steel of which the armor layers are made, and replacing some of the armor wires with filling wires.

21. The one-piece subsea flexible tubular pipe according to claim 16, further comprising at least one layer of thermal insulation over the armor layers; and the modifyed layer is the thermal insulation layer, wherein the modifications are in thermal performance.

22. The pipe as claimed in claim 15, wherein the armor layers are of steel and comprise armor wires, and the modified layer is the armor layers; and wherein the modification is selected from the group consisting of modifying the moment of inertia by changing the thickness of the plies of the armor layers, modifying the mechanical properties of the steel of which the armor layers are made, and replacing some of the armor wires with filling.

23. The pipe as claimed in claim 15, further comprising at least one layer of thermal insulation over the armor layers; and the modified layer is the thermal insulation layer, wherein the modifications are in thermal performance.

24. The one-piece subsea flexible tubular pipe extending between ends of the pipe, the pipe comprising, from the inside outward, layers including: a carcass made of interlocked metal strip; an inner sealing sheath made of a polymer material; and at least one ply of tensile armor layers wound with a long pitch and disposed outward of the inner sheath;
the one-piece pipe having a length and having sections along the length thereof that are subject to different internal and external stresses over the length of the pipe, wherein the physical characteristics of at least one of the layers are modified at manufacture over at least one section of the length of the pipe, without any intermediate connector between the sections of the pipe.

25. The pipe as claimed in claim 24, in which the modified layer is the carcass, wherein the modification is selected from the group consisting of modifying the moment of inertia by changing the thickness or the interlocking shape of the strip, modifying the mechanical properties by changing the nature of the material of which the strip is composed and changing the treatment that the strip undergoes during its manufacture.

26. A one-piece subsea flexible tubular pipe extending between ends of the pipe, the pipe comprising, from the inside outward, layers including: an inner sealing sheath made of the polymer material; a vault comprising a winding of an interlocked metal element wound in a helix with a short pitch and placed over the inner sheath; and at least one ply of tensile armor layers wound with a long pitch and exposed around the pressure vault;
the one-piece pipe having a length and having sections along the length thereof that are subject to different internal and external stresses over the length of the pipe, wherein the physical characteristics of at least one of the layers at modified at manufacture over at least one section of the length of the pipe, without any intermediate connector between the sections of the pipe.

27. The pipe as claimed in claim 26, in which the modified layer is the vault, wherein the modification is selected from the group consisting of modifying the moment of inertia by changing the thickness of the wire and modifying the mechanical properties of the steel of which the wire is made.

28. The pipe as claimed in claim 26, further comprising a hoop of metal wire wound with a shorter pitch than the armor layer around the vault, wherein the modified layer is the hoop, and hwerein the modification is selected from the group consisting of modifying the moment of inertia by changing the thickness of the hoop and modifyig the mechanical properties of the steel of which the hoop is made.

29. A one-piece subsea flexible tubular pipe extending between ends of the pipe, the pipe comprising, from the inside outward, layers including: an inner sealing sheath made of a polymer material; at least one ply of tensile armor layers wound with a long pitch and disposed outward of the inner sheath; and an outer protective sealing sheath made of a polymer and outside the armor layer;
the one-piece pipe having a length and having sections along the length thereof that are subject to different internal and external stresses over the length of the pipe, wherein the physical characteristics of at least one of the layers are modified at manufacture over at least one section of the length of the pipe, without any intermediate connector between the sections of the pipe.

30. A one-piece subsea flexible tubular pipe extending between ends of the pipe, the pipe comprising, from the inside outward, at least some of the following layers: a carcass made of interlocked metal strip; an inner sealing sheath made of a polymer material; a vault comprising a winding of an interlocked metal element wound in a helix with a short pitch and placed over the inner sheath; at least one ply of tensile armor layers wound with a long pitch around the pressure vault; and an outer protective sealing sheath made of a polymer;
the one-piece pipe having a length and having sections along the length thereof subjected to different internal and external stresses over its length, wherein the physical characteristics of at least one of the layers are modified at manufacture over at least one section of the length of the pipe, without any intermediate connector between the sections of the pipe.

31. The pipe as claimed in claim 30, wherein the at least one modified layer has an outside diameter and that outside diameter is not substantially modified in the section as compared with the outside diameter of the layer other than in the section.

32. The pipe as claimed in claim 30, in which the modified layer is the carcass, wherein the modification is selected from the group consisting of modifying the moment of inertia by changing the thickness or the interlocking shape of the strip, modifying the mechanical properties by changing the nature of the material of which the strip is composed and changing the treatment that the strip undergoes during its manufacture.

33. The pipe as claimed in claim 30, in which the modified layer is the vault, wherein the modification is selected from the group consisting of modifying the moment of inertia by changing the thickness of the wire and modifying the mechanical properties of the steel of which the wire is made.

34. The pipe as claimed in claim 30, further comprising a hoop of a metal wire wound with a shorter pitch than the armor layer around the vault, wherein the modified layer is the hoop, and wherein the modification is selected from the group consisting of modifying the moment of inertia by changing the thickness of the hoop and modifying the mechanical properties of the steel of which the hoop is made.

35. The pipe as claimed in claim 30, wherein the armor layers are of steel and comprise armor wires; and the modified layer is the armor layers, and wherein the modification is selected from the group consisting of modifying the moment of inertia by changing the thickness of the plies of the armor layers, modifying the mechanical properties of the steel of which the armor layers are made, and replacing some of the armor wires with filling wires.

36. The pipe as claimed in claim 30, further comprising at least one layer of thermal insulation over the armor layers; and the modified layer is the thermal insulation layer, wherein the modifications are in thermal performance.

* * * * *